(12) United States Patent  (10) Patent No.: US 7,917,028 B2
Lin  (45) Date of Patent: Mar. 29, 2011

(54) PORTABLE ELECTRONIC DEVICE WITH REPLACEABLE CAMERA MODULE

(75) Inventor: Tsung-Yu Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 78 days.

(21) Appl. No.: 12/346,805

(22) Filed: Dec. 30, 2008

(65) Prior Publication Data

US 2009/0297136 A1 Dec. 3, 2009

(30) Foreign Application Priority Data

May 27, 2008 (CN) .......................... 2008 1 0301795

(51) Int. Cl.
*G03B 7/099* (2006.01)
*G03B 17/02* (2006.01)
(52) U.S. Cl. ....................... 396/268; 396/541
(58) Field of Classification Search .................. 396/268, 396/541
See application file for complete search history.

(56) References Cited

U.S. PATENT DOCUMENTS

| | | | | |
|---|---|---|---|---|
| 2006/0219884 A1* | 10/2006 | Tsukamoto et al. | .......... | 250/239 |
| 2006/0219885 A1* | 10/2006 | Kinoshita et al. | ............. | 250/239 |
| 2006/0221225 A1* | 10/2006 | Tsukamoto et al. | .......... | 348/340 |
| 2008/0037143 A1* | 2/2008 | Yoon | .............................. | 359/824 |
| 2008/0265134 A1* | 10/2008 | Kinoshita | ...................... | 250/206 |
| 2008/0266684 A1* | 10/2008 | Chang | ............................ | 359/827 |
| 2009/0160998 A1* | 6/2009 | Fukamachi et al. | .......... | 348/340 |

* cited by examiner

*Primary Examiner* — Rodney E Fuller
(74) *Attorney, Agent, or Firm* — Clifford O. Chi

(57) ABSTRACT

A portable electronic device includes a camera module and a main body. The camera module includes a housing, a lens received in the housing, an image sensor received in the housing for capturing an image of an object, a first ferromagnetic or magnetic element fixed to the housing, a plurality of metallic connecting pins electrically connected to the image sensor and exposed at an opposite side of the image sensor to the lens. The main body includes a printed circuit board, and a second ferromagnetic or magnetic element. The camera module is detachably coupled to the main body in a manner that the first ferromagnetic or magnetic element is magnetically attached to the second ferromagnetic or magnetic element, and the metallic connecting pins are electrically coupled to the printed circuit board.

12 Claims, 7 Drawing Sheets

PORTABLE ELECTRONIC DEVICE WITH REPLACEABLE CAMERA MODULE

BACKGROUND

1. Technical Field

The present disclosure generally relates to portable electronic devices, and particularly relates to a portable electronic device having a replaceable camera module.

2. Discussion of Related Art

Portable electronic devices employing a zoom camera module, such as mobile phones, portable computers, electronic game players, and others, are in widespread use. Generally, the zoom camera module is permanently fixed in a dedicated location defined in the electronic device. The zoom camera modules usually include at least one lens, an image sensor, and a lens actuator having complicated structures for driving the lens moving relatively to the image sensor to obtain a desired focal length.

However, portable electrical devices are increasingly small and compact, such that accommodating space for the module is limited. As a result, an optical zoom ratio of the camera module is limited. It is unfeasible to meet all user requirements without replacing the camera module.

Therefore, what is needed is a portable electronic device having a replaceable camera module to address the described limitations.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of embodiments. Moreover, in the drawings, like reference numerals designate corresponding parts throughout the different views.

DETAILED DESCRIPTION OF EMBODIMENTS

Figure 1:
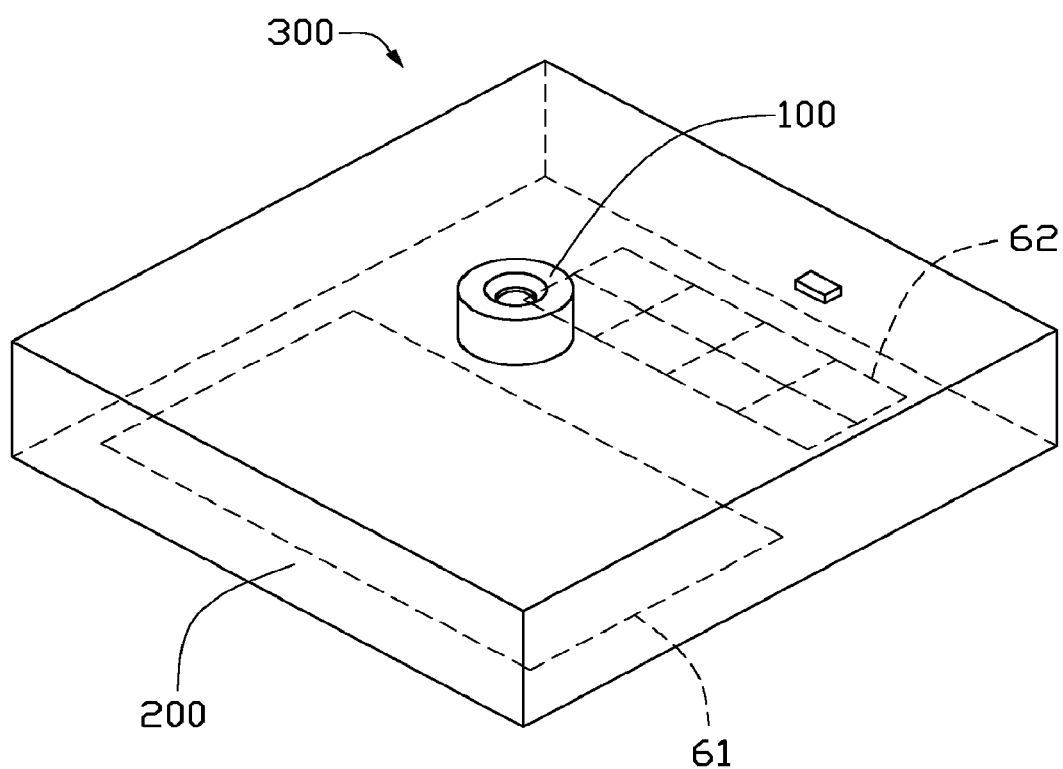
FIG. 1 is an isometric view of a portable electronic device including a replaceable camera module and a main body in accordance with a first embodiment.

Referring to FIG. 1, a portable electronic device 300 includes a main body 200 and a camera module 100 detachably accommodated therein. In the illustrated embodiment, the portable electronic device 300 is a cell phone. A display screen 61 and an alphanumeric keypad 62 are positioned on a surface of the main body 200.

Figure 2:
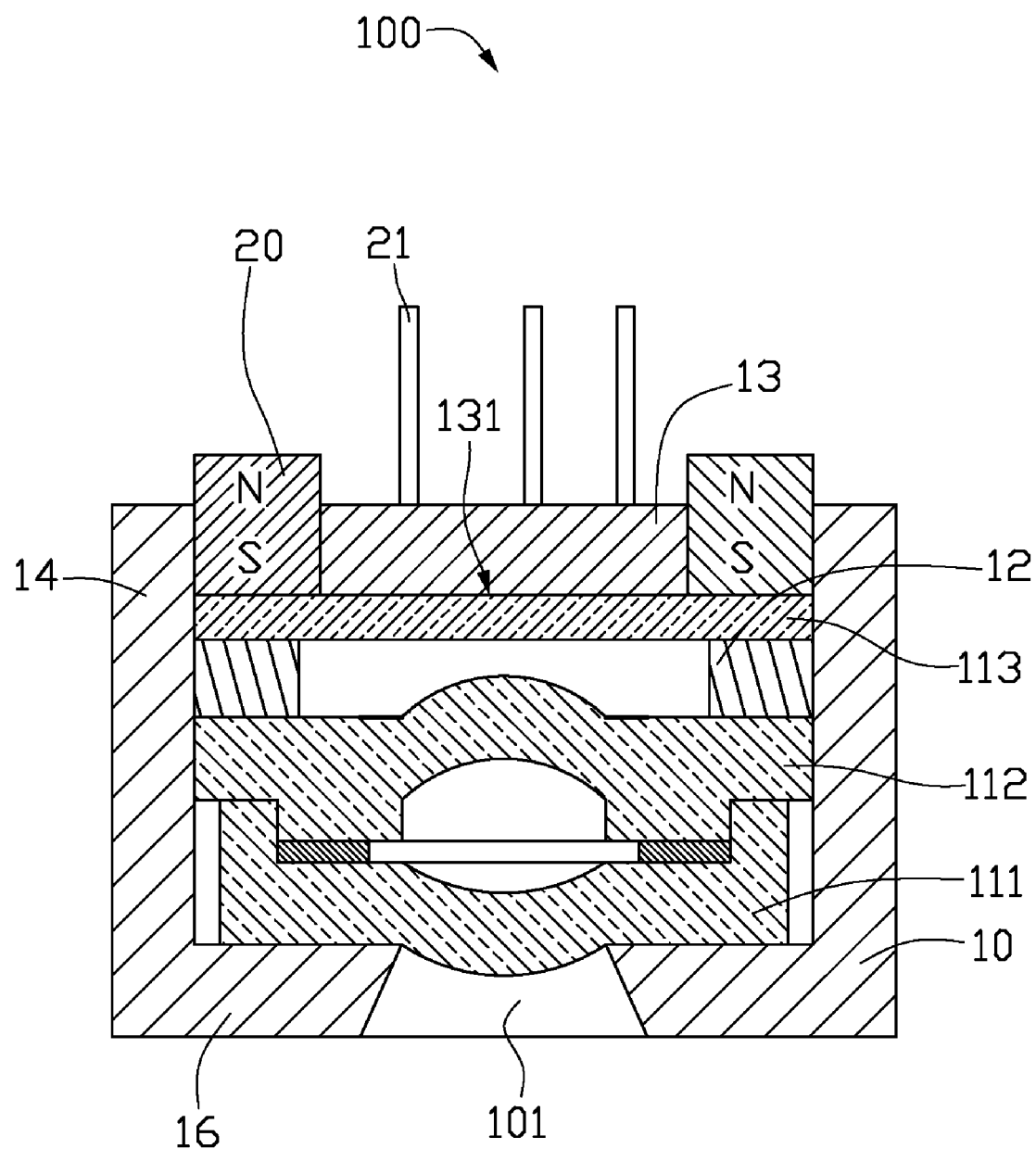
FIG. 2 is a cross-section view of the replaceable camera module of the portable electronic device shown in FIG. 1.

Referring to FIG. 2, the replaceable camera module 100 includes a housing 10, a first lens 111, a second lens 112, a light pervious covering member 113, a spacer 12, an image sensor 13 for capturing an image of an object, two first magnets 20, and a plurality of metallic connecting pins 21.

The housing 10 has a first side 16 and an opposite second side 14. An aperture 101 for receiving light is defined in the first side 16. A transparent mask (not shown) can be placed in the aperture 101 to prevent contaminants from entering the housing 10 via the aperture 101. The second side 14 is defined for seating the first magnets 20 and the connecting pins 21.

The first lens 111, the second lens 112, the light pervious covering member 113 and the image sensor 13 are arranged sequentially from the first side 16 to the second side 14. The first lens 111 and the image sensor 13 are respectively exposed to an exterior of the housing 10 at the first side 16 and the second side 14. The first lens 111 and the second lens 112 are fixed using known joggled process or agglutination method. The image sensor 13 has a sensing surface 131 facing toward the first and second lenses 111, 112. The image sensor 13 can be a charge coupled device (CCD) or a complementary metal oxide semiconductor (CMOS). The light pervious covering member 113 contacts the sensing surface 131 of the image sensor 13. The light pervious covering member 113 is an IR-cut filter for transmitting light in the visible spectrum while blocking light in the infrared spectrum and protecting the image sensor 13 from interference from infrared radiation. Alternately, the light pervious covering member 113 can be a UV-cut filter, glass or quartz plate.

The spacer 12 separates the second lens 112 and the light pervious covering member 113.

The first magnets 20 can be fixed on the inner or the outer side surface of the housing 10. In this embodiment, the first magnets 20 are bar ferromagnetic magnets, directly fixed on the inner side surface at the second side 14 with a connecting line of two magnetic polarities thereof parallel to the central axis of the housing 10. The two first magnets 20 are respectively located at two opposite sides of the image sensor 13 and exposed at the second side 14 of the housing 10. An end of each magnet 20 protrudes from the second side 14. The connecting pins 21 are perpendicularly fixed on the opposite surface of the image sensor 13 to the sensing surface 131 with being exposed at the second side 14 of the housing 10, and electrically connected to the image sensor 13. As such, contaminations are prevented from attaching on the sensor surface 131.

In addition, the light pervious covering member 113 can be disposed adjacent to the sensing surface 131 or abuts but not contact the sensing surface 131. The camera lens 100 can include a plurality of ferromagnetic or magnetic elements disposed around the image sensor 13. Furthermore, the first magnet 20 can be hollow and cylindrical, receiving the image sensor 13 therein. The camera lens 100 can further comprise a mounting member fixed to the second side 14 of the housing 10. The mounting member can be a connecting cylinder, with the image sensor and the first magnet fixed thereon.

Figure 3:
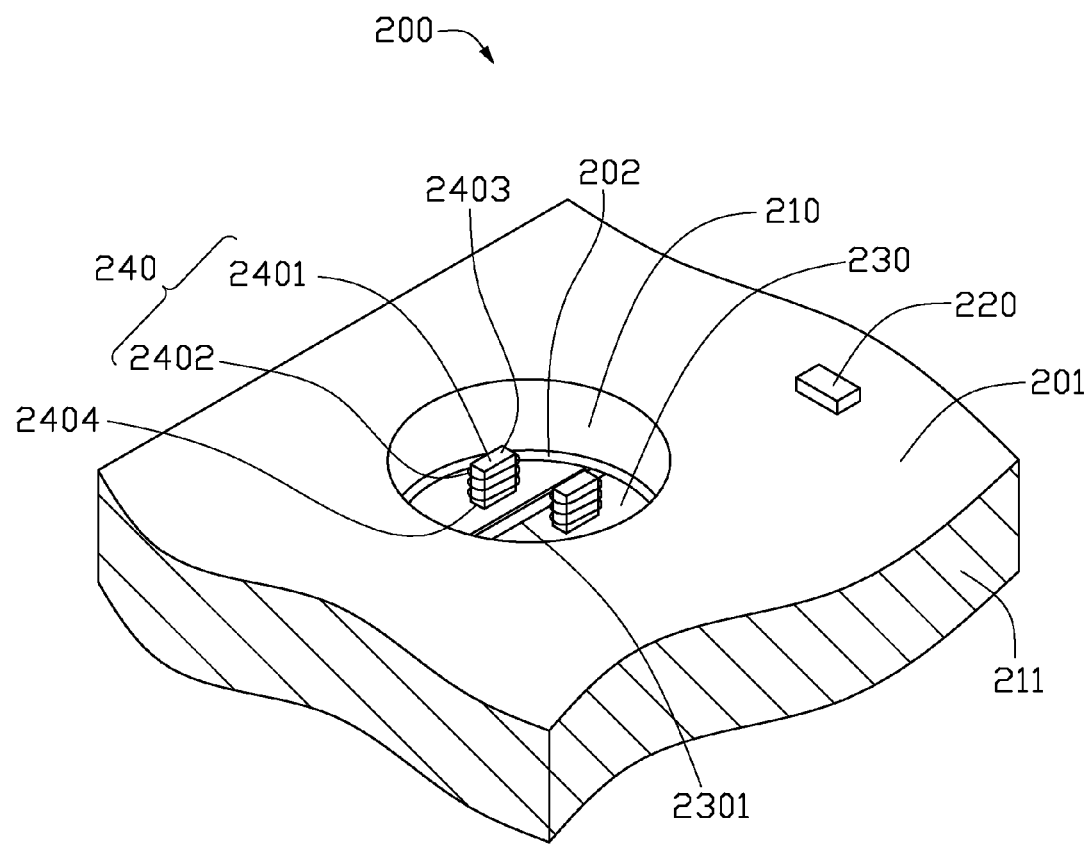
FIG. 3 is an isometric view of the main body of the portable electronic device shown in FIG. 1.

Referring to FIG. 3, the main body 200 includes a base 211, a printed circuit board (PCB) 230, a controller 220, and two second magnets 240. The base 211 defines an outer surface 201 and a cavity 210 accommodating the camera module 100. The main body 200 can be of an electronic device such as a mobile phone, camera, portable computer, electronic game player, or other. The cavity 210 is defined from the outer surface 201 towards an inner portion of the main body 200. The main body 200 includes an inner bottom surface 202 in the cavity 210.

The PCB 230 is partially exposed via the cavity 210, contacting the inner bottom surface 202. The PCB 230 includes a plurality of connecting pads 2301 electrically connected to a processor (not shown) disposed in the main body 200.

The two second magnets 240 are electromagnets, each including a first end portion 2404 and an opposite second end portion 2403. The first end portion 2404 can be fixed on the PCB 230 or on the inner bottom surface 202, with the second end portion 2403 adjacent to the outer surface 201. A connecting line of the first and the second end portions 2404, 2403 is approximately parallel to the central axis of the cavity 210. The second magnet 240 includes a core 2401 and a coil 2402 wrapped therearound. The coil 2402 can be in electrical connection with a power supply (not shown). The core 2401 is columnar, and of ferromagnetic material. When current is applied to the coil 2402, a magnetic field is generated around the core 2401, with the first and the second end portions 2401, 2403 providing magnetic polarities of the second magnets 240. Alternately, the core 2401 can be of another shape, and the number of the second magnets 240 need not be limited to two.

The controller 220 protrudes from the outer surface 201, and is electrically connected with the power supplier and the coil 2402. The controller 220 controls a direction of the current in the coil 2402.

Alternately, the second magnets 240 can be permanent magnets or other magnetic members. In this instance, the controller 220 can be omitted. The main body 200 further includes a display screen for displaying the image captured by the image sensor 13, or a cell phone module for performing mobile communication, or an alphanumeric keypad.

Figure 4:
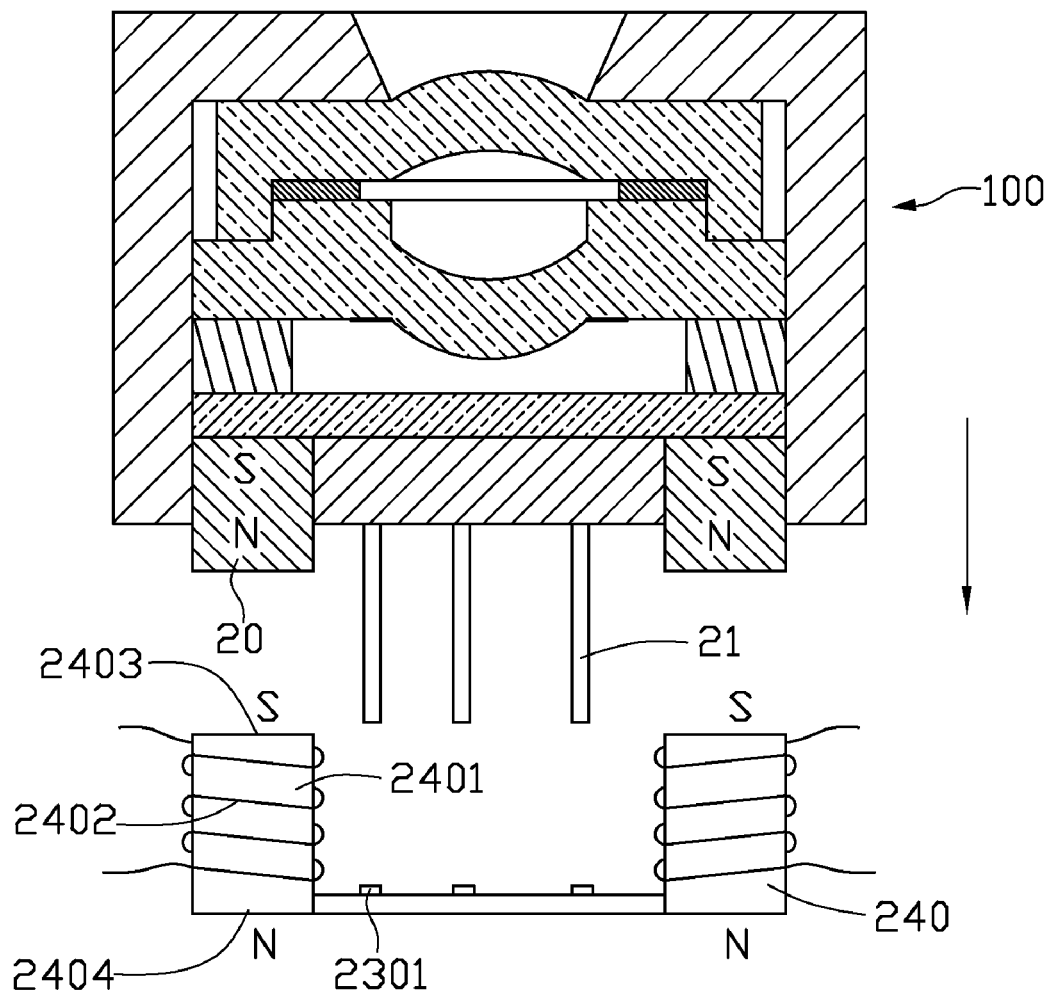
FIG. 4 is similar to FIG. 1, showing the replaceable camera module being fixed to the main body.
Figure 5:
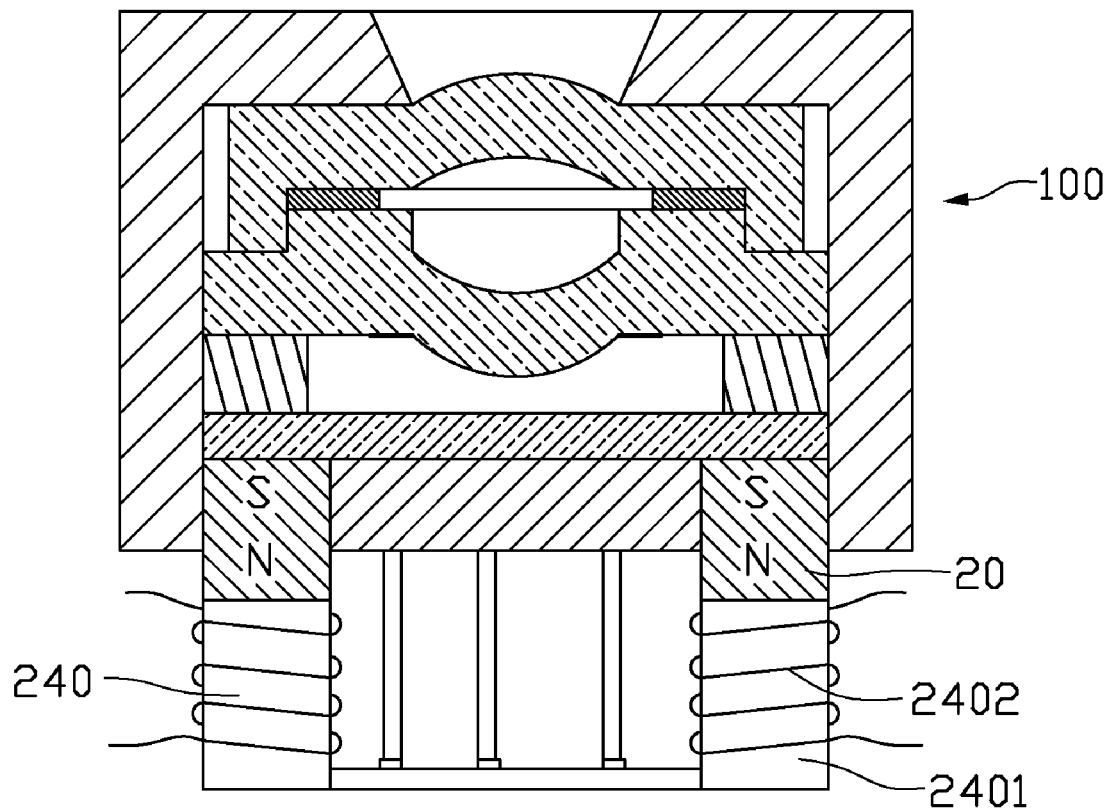
FIG. 5 is similar to FIG. 1, but showing a cross-section view.

Referring to FIGS. 2 and 4, when a current is applied to the coil 2402, a magnetic field is produced therearound, with the first end portion 2404 of the core 2401 taking N polarity and the second end portion 2403 of the core 2401 S polarity. Thus, inter-attraction is generated between the second magnets 240 and the first magnets 20, moving the replaceable camera module 100 towards the main body 200 until the N polarity of the first magnets 20 is attracted to the second end portion 2403 of the electronic magnets 240 and the connecting pins 21 are electrically coupled to the connecting pads 2301 of the PCB 230, as shown in FIG. 5. In this manner, the replaceable camera module 100 is fixed in the main body 200, the portable electronic device 300 achieves a function of imaging.

To allow power management, current through coil 2402 can be stopped using the controller 220 when the replaceable camera module 100 is accommodated in the main body 200. The permanent magnets 20 remain attracted to the core 2401 of the electronic magnets 240.

Figure 6:
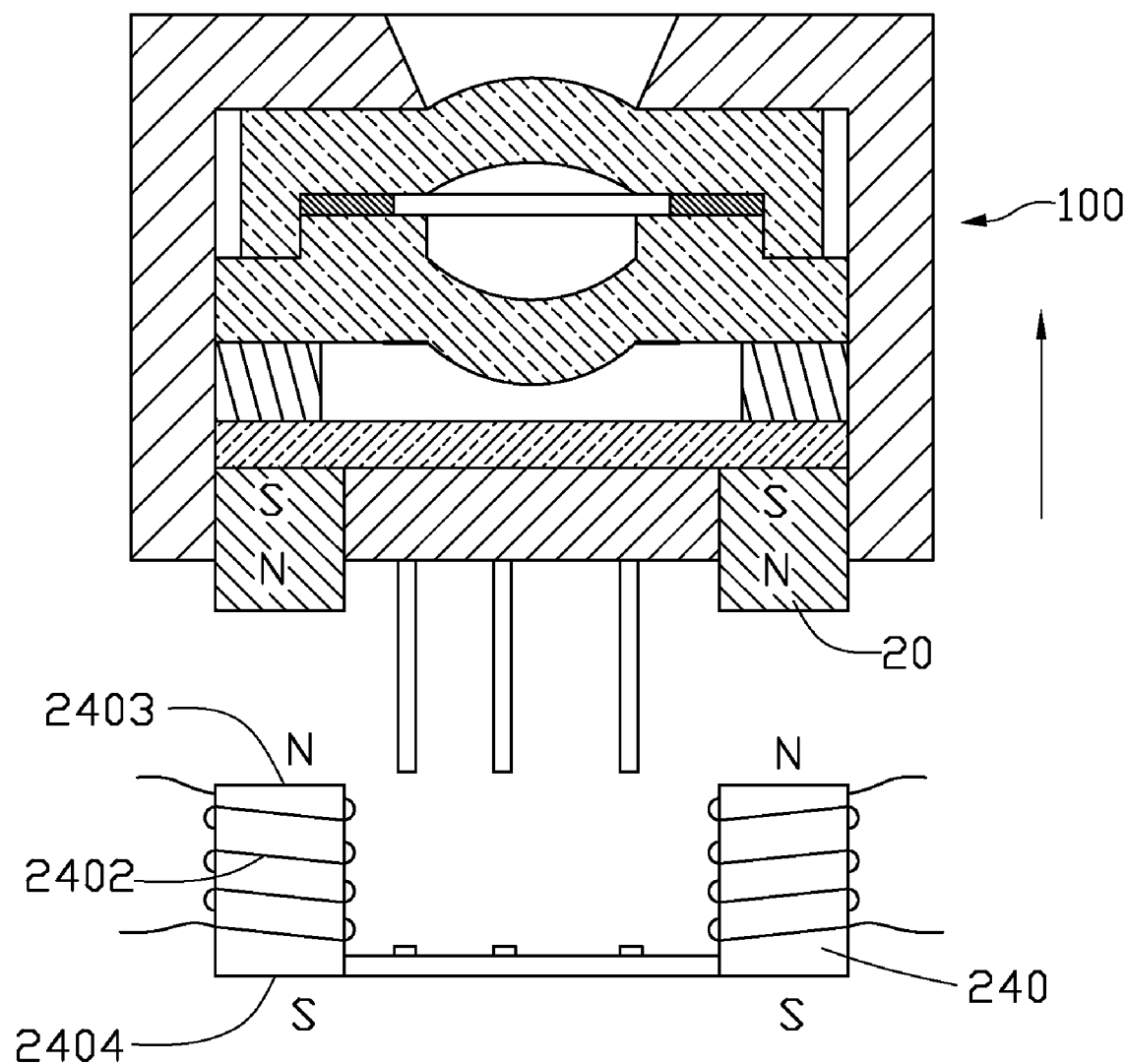
FIG. 6 is similar to FIG. 1, but showing removal of the replaceable camera module from the main body.

Referring to FIGS. 1, 2 and 6, to replace the camera module 100, for example, with an alternate lens complement, current flowed through coil 2402 is reversed to invert the polarities of the electronic magnets 240. Accordingly, first end portion 2404 takes S polarity and second end portion 2403 N polarity. Thus, a repellent force is generated between the second magnets 240 and the first magnets 20, and the camera module 100 moves away from second magnets 240. As such, the replaceable camera module 100 is separated from the main body 200, and another replaceable camera module 100 can be accommodated in the cavity 210.

Figure 7:
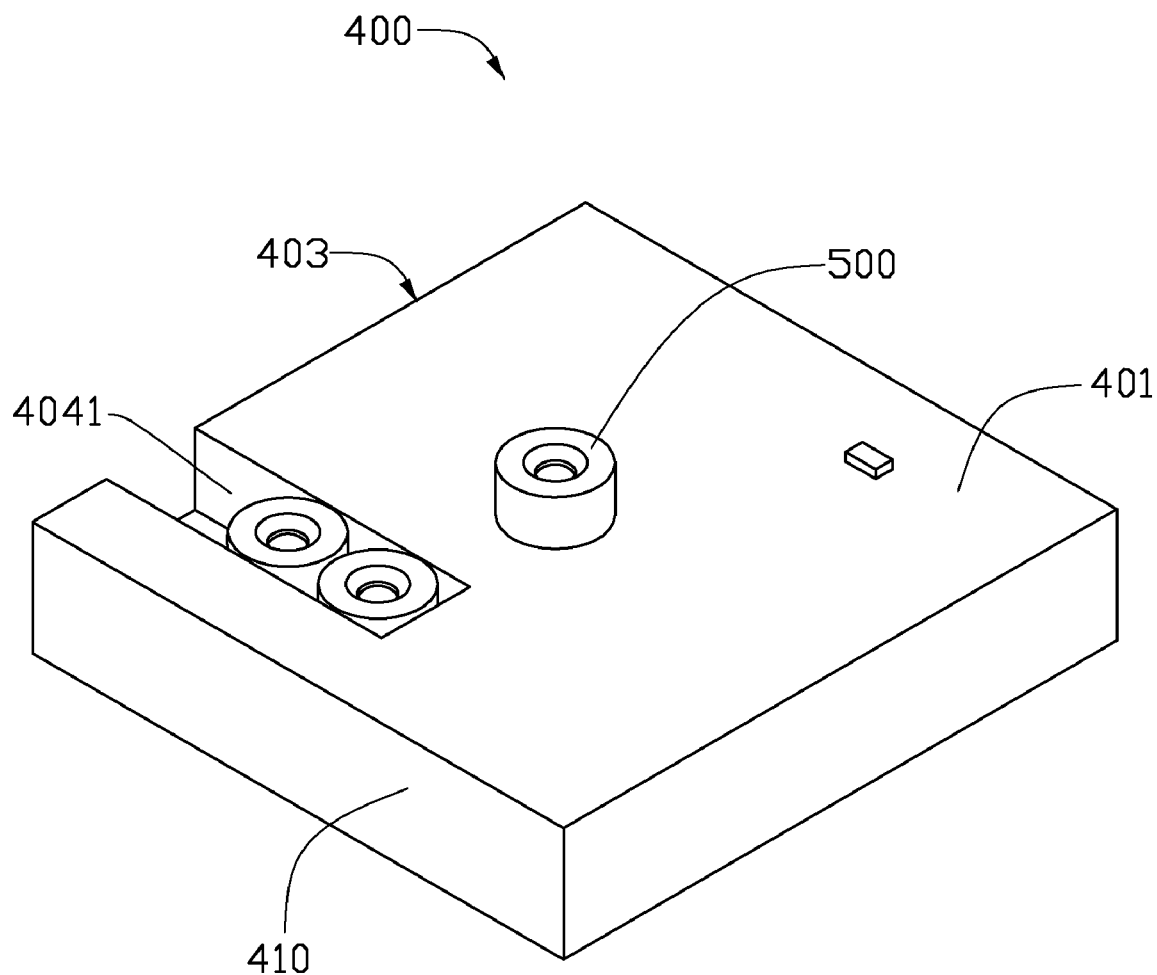
FIG. 7 shows a portable electronic device in accordance with a second embodiment.

FIG. 7 shows a second portable electronic device 400, differing from portable electronic device 300 only in that that the main body 410 further defines a side surface 403 and a space 4041 accommodating a plurality of replaceable camera modules 500. The space 4014 passes through the side surface 403. As such, it allows multiple replaceable camera modules to be transported with the portable electronic device.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A portable electronic device, comprising:
   a camera module comprising
   a housing;
   a lens received in the housing;
   an image sensor received in the housing for capturing an image of an object, the image sensor having a sensing surface facing toward the lens;
   a first ferromagnetic or magnetic element fixed to the housing;
   a plurality of metallic connecting pins electrically connected to the image sensor and exposed at an opposite side of the image sensor to the lens;
   a main body including a printed circuit board, and a second ferromagnetic or magnetic element, the camera module detachably coupled to the main body in a manner that the first ferromagnetic or magnetic element is magnetically attached to the second ferromagnetic or magnetic element, the metallic connecting pins are electrically coupled to the printed circuit board.

2. The portable electronic device as claimed in claim 1, wherein the camera module further comprises a light pervious covering member disposed adjacent to the sensing surface of the image sensor.

3. The portable electronic device as claimed in claim 2, wherein the light pervious covering member abuts but not contact the sensing surface of the image sensor.

4. The portable electronic device as claimed in claim 2, wherein the light pervious covering member contacts the sensing surface of the image sensor.

5. The portable electronic device as claimed in claim 2, wherein the housing includes a first side and an opposing second side, the lens exposed to an exterior of the housing at the first side, the image sensor exposed to the exterior of the housing at the second side.

6. The portable electronic device as claimed in claim 5, wherein the first ferromagnetic or magnetic element is exposed at the second side of the housing.

7. The portable electronic device as claimed in claim 6, wherein the metallic connecting pins extend from the opposite surface of the image sensor to the sensing surface.

8. The portable electronic device as claimed in claim 7, wherein the connecting pins are perpendicular to the opposite surface of the image sensor to the sensing surface.

9. The portable electronic device as claimed in claim 5, wherein the metallic connecting pins are exposed to the exterior of the housing at the second side.

10. The portable electronic device as claimed in claim 1, wherein the main body includes a display screen for displaying the image captured by the image sensor.

11. The portable electronic device as claimed in claim 1, wherein the main body includes a cell phone module for performing mobile communication.

12. The portable electronic device as claimed in claim 1, wherein the main body includes an alphanumeric keypad.

* * * * *